United States Patent [19]

Kim et al.

[11] Patent Number: 6,069,977
[45] Date of Patent: May 30, 2000

[54] IMAGE COMPRESSION METHOD USING WAVELET TRANSFORM TECHNIQUES

[75] Inventors: Youg-kyu Kim, Kwacheon; Kyu-tae Park, Seoul; Im-geun Lee, Seoul; Jong-sik Kim, Seoul, all of Rep. of Korea

[73] Assignee: Samsung Electronics Co., Ltd., Kyungki-Do, Rep. of Korea

[21] Appl. No.: 08/588,895

[22] Filed: Jan. 19, 1996

[30] Foreign Application Priority Data

May 29, 1995 [KR] Rep. of Korea ........................ 95-13684

[51] Int. Cl.[7] .............................. G06K 9/36; H04N 7/12
[52] U.S. Cl. .......................... 382/240; 382/248; 348/398; 348/405
[58] Field of Search .................... 348/398, 390, 348/384, 405, 415; 382/240, 248, 168, 169, 232

[56] References Cited

U.S. PATENT DOCUMENTS 5,321,776  6/1994  Shapiro .................................... 382/240

OTHER PUBLICATIONS

Kim et al, "New tree structure with conditional height difference for wavelet transform image coding" Electronics Letters Jan. 1995 vol. 31, No. 2.

*Primary Examiner*—Thomas D. Lee
*Assistant Examiner*—Wenpeng Chen
*Attorney, Agent, or Firm*—Sughrue, Mion, Zinn, Macpeak & Seas, PLLC

[57] ABSTRACT

An image compression method is provided which uses a wavelet transform technique to generate transform coefficients relating to an input image. Furthermore, the method generates and encodes an efficient tree structure of the transform coefficients by performing the following steps. First, transform coefficients are obtained by transforming an input image in accordance with the wavelet transforming technique. Then, a quantizing interval which minimizes quantization errors is determined for a predetermined step size and is determined according to statistical characteristics of the input image. Then, a simple tree structure is generated based on the transform coefficients, and such tree structure is modified by using statistical characteristics of the transform coefficients to produce a monotonically decreasing tree structure. The resultant tree structure is modified by limiting a maximum height difference between parent nodes and child nodes of the tree structure to produce the tree list. In addition, the transform coefficients may be quantized based on the quantizing interval to produce quantized transform coefficients, and the modified tree list and the quantized transform coefficients may be arithmeticlly coded.

22 Claims, 4 Drawing Sheets

IMAGE COMPRESSION METHOD USING WAVELET TRANSFORM TECHNIQUES

FIELD OF THE INVENTION

The present invention relates to a compression coding method which uses a wavelet transform (WT) technique. More particularly, the invention pertains to a quantization method in which a quantization error is reduced and pertains to a method for creating an effective tree list for coding a compressed image. Furthermore, this application corresponds to Korean Patent Application No. 95-13684.

BACKGROUND OF THE INVENTION

Some of the more popular digital image compression techniques used in communication and data storage devices include various standardized compression coding methods. For example, such compression techniques utilize coding methods developed by the Moving Pictures Expert Group (MPEG) or the Joint Photographic Experts Group (JPEG) in which discrete cosine transform (DCT) and Huffman coding are used. Furthermore, the methods may also utilize vector quantization or sub-band coding.

Figure 1:
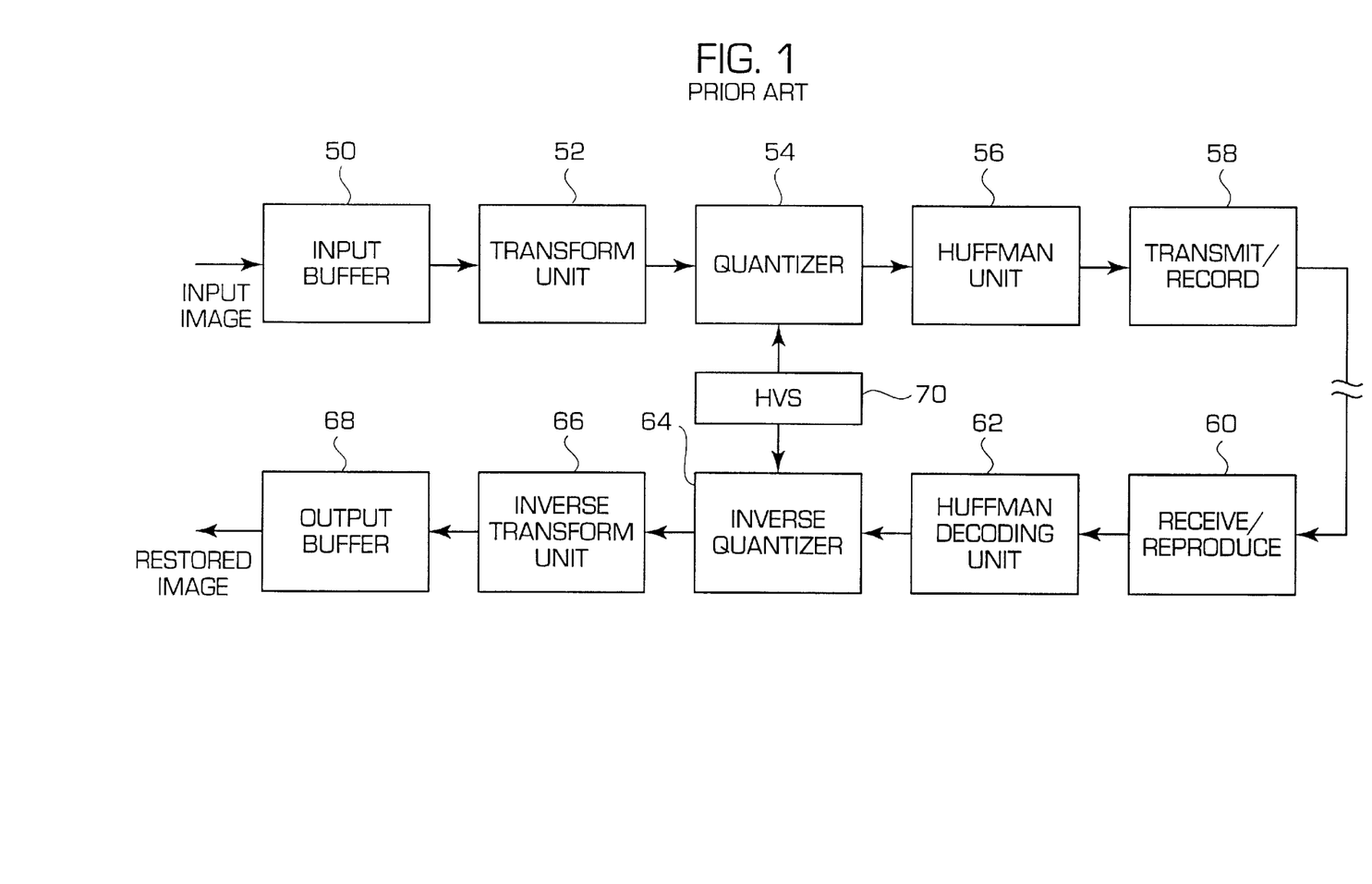
FIG. 1 is a block diagram showing a conventional image compression device.

A block diagram of a conventional compression coding device which uses an MPEG or JPEG compression coding method is shown in FIG. 1. As illustrated in the figure, the device comprises a compression system for compressing digital data and a decompression system for decompressing digital data. In particular, the compression system comprises an input buffer 50, a transform unit 52, a quantizer 54, a Huffman coding unit 56, and a transmitter/recorder 58. In addition, the decompression system contains a receiver/reproducer 60, a Huffman decoding unit 62, an inverse quantizer 64, an inverse transform unit 66, and an output buffer 68.

In order to compress a digital input image, the image is input to the transform unit 52 via the buffer 50 and is transformed according to a DCT function to produce various transform coefficients which correspond to the image. Subsequently, the transform coefficients are output to and quantized by the quantizer 54. Furthermore, the coefficients are not quantized by subdividing them by a uniform interval, but are differentially subdivided by a spatial frequency by using a human visual system (HVS) 70. Then, the quantized coefficients are compressed by the Huffman coding unit 56 in accordance with appropriate statistical characteristics corresponding to the input image. Finally, the compressed data is transmitted to a receiver or recorded on a recording medium by the transmitter/recorder 58.

In addition, compressed data may be expanded into a restored image by the decompression system. In particular, the components of the decompression system perform functions which are similar but opposite to the functions executed by the compression system.

In the DCT compression coding method shown in FIG. 1, an input image is divided into many uniform blocks and a cosine function kernel is applied to each block to enhance the compression by preventing the generation of an overlapping image. However, even though a high compression rate may be attained, a severe blocking effect is generated.

Also, the vector quantization method utilized by the compression system is also advantageous due to its contribution to the high compression rate. However, since such method requires excessive calculations for a code-book training process and data compression, it cannot be used for real time systems.

On the other hand, the sub-band method reduces the blocking effect which occurs during high rates of data compression and is more efficient than conventional DCT methods. However, such method cannot obtain a high quality image since it employs a low compression rate.

Therefore, in order to overcome the above problems, a wavelet transform (WT) method has been introduced. Since this method encodes image signals based on time and frequency, the wavelet transform (WT) method is useful for analyzing non-stationary signals and is advantageous because it is similar to the human visual system (HVS).

Wavelet transformation (WT) is an integrated theory comprising a multi-resolution analysis of sub-band coding and a conventional method in which images are divided into a plurality of sub-images that are expressed as a pyramidal structure. In other words, each sub-image has hierarchical information ranging from a low-frequency band to a high-frequency band such that more appropriate coding can be performed.

SUMMARY OF THE INVENTION

Accordingly, it is an object of the present invention to provide an efficient image compression method using a wavelet transform technique.

It is another object of the present invention to provide a quantization method in which quantization errors are minimized in an image compression method using a wavelet transform technique.

It is still another object of the present invention to provide a method of generating an effective tree list of transform coefficients in an image compression method using a wavelet transform method.

It is yet another object of the present invention to provide a method for coding the tree list.

It is still yet another object of the present invention to provide a method for coding transform coefficients in an image compression method using a wavelet transform technique.

In order to achieve one of the objects above, an image compression method using a wavelet transform technique is provide. In particular, the method comprises the steps of: (a) obtaining transform coefficients by transforming an input image in accordance with the wavelet transforming technique; (b) determining a quantizing interval which minimizes quantization errors in a predetermined step size, wherein the quantization interval is determined according to statistical characteristics of the input image; (c) generating a simple tree structure based on the transform coefficients; (d) modifying the simple tree structure by using statistical characteristics of the transform coefficients to produce a monotonically decreasing tree structure, wherein the monotonically decreasing tree structure comprises a parent node and child nodes which correspond to the parent node; (e) modifying the monotonically decreasing tree structure by limiting a maximum height difference between the parent node and the child nodes to produce a modified tree list; (f) quantizing the transform coefficients based on the quantizing interval to produce quantized transform coefficients; and (g) arithmetically coding the modified tree list and the quantized transform coefficients.

In order to achieve another one of the objects above, a quantization method is provided. Specifically, the method comprises the steps of: (a) obtaining a density function $p(x)$ based on a histogram of transform coefficients; (b) manipulating the density function $p(x)$ such that the density function p(x) approximates a piece wise linear function; and (c) determining the quantizing interval having minimal quantization errors based on the piece wise liner function.

In order to accomplish still another object of the present invention, a method of generating a tree list of wavelet transform coefficients is provided. In particular, the method comprises the steps of: (a) determining a height $h(C_{ij})$ of the transform coefficients $C_{ij}$; (b) modifying the transform coefficients $C_{ij}$ so that they monotonically decrease; (c) generating the tree list based on the modified transform coefficients $C_{ij}$.

In order to accomplish yet another object of the present invention, a method for coding a tree list is provide. Specifically, the method comprises the steps of: (a) separating a set S of symbols in a modified tree list into N subsets $S_1$ to $S_N$, wherein the symbols relate to an input image and wherein the subsets $S_1$ to $S_N$ are capable of being independently coded and decoded; (b) determining a particular subset $S_i$ of the subsets $S_1$ to $S_N$ to which particular symbols of the symbols belong based on previously coded information contained within the modified tree list; (c) coding the particular symbols which correspond to the particular subset $S_i$ by an arithmetic coder which corresponds to the particular subset $S_i$; and (d) arithmetically coding at least one quantized transform coefficient by dividing the quantized transform coefficient into code data and size data and arithmetically coding the code data and the size data.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 2A:
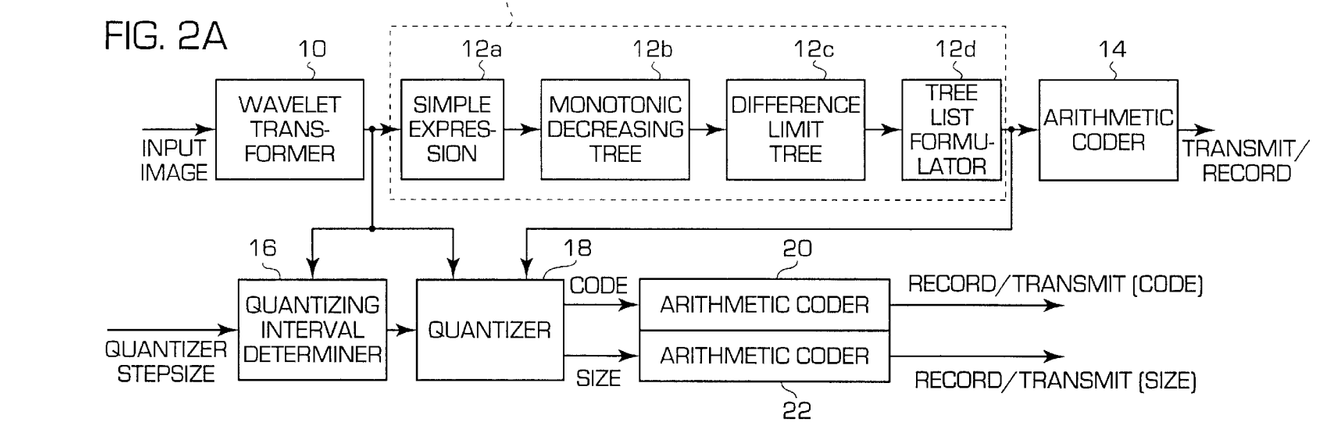
FIG. 2A is a block diagram showing an embodiment of a coding device using a compression coding method according to the present invention.

FIG. 2A is a block diagram showing an image compression coder according to the present invention. As shown in the figure, the device comprises a wavelet transformer 10, a tree processor 12, a first arithmetic coder 14, a quantizing interval determiner 16, a quantizer 18, a second arithmetic coder 20, and a third arithmetic coder 22.

The wavelet transformer 10 inputs a digital input image and wavelet-transforms the image to generate corresponding transform coefficients, and the tree processor 12 manipulates the transform coefficients according to geometrical or statistical characteristics of the image to produce a tree list. The first arithmetic coder 14 encodes the tree list and transmits the encoded tree list to a receiver or records the encoded tree list on a recording medium.

The quantizing interval determiner 16 inputs quantizer step size data from an external source and inputs the transform coefficients output from the wavelet transformer 10. Then, the determiner 16 calculates an appropriate quantizing interval for quantizing the transform coefficients based on the quantizer step size data. Afterwards, the quantizer 18 inputs the transform coefficients from the transformer 10, the quantizing interval calculated by the determiner 16, and the tree list output from the processor 12. Then, the quantizer 18 quantizes the transform, coefficients in accordance with the tree list and the quantizing interval and generates code data and size data representing the quantized coefficients. The second and third arithmetic coders 20 and 22 respectively input and arithmetically encode the code and size data, and the encoded code and size data are transmitted to the receiver or recorded on the recording medium.

As shown in FIG. 2A, the tree processor 12 comprises a simple tree processor 12a, a monotonic decreasing tree processor 12b, a difference limit tree processor 12c, and a tree list formulator 12d. The simple tree processor 12a inputs the transform coefficients from the wavelet transformer 10 and generates a simple tree structure based on such coefficients. In other words, the tree structure contains parent nodes and child nodes which have values that are determined by the transform coefficients.

The monotonic decreasing tree processor 12b inputs the simple tree structure and determines if all of the child nodes have values which are less than the value of the corresponding parent node. If the values of any of the child nodes are larger than the value of the parent node, the processor 12b changes the value of the parent node such that it is greater than or equal to the value of child node. As a result, the processor 12b inputs the simple tree structure and generates a monotonically decreasing tree structure.

In addition to ensuring that the tree structure monotonically decreases, the difference between the values of the parent node and each of the child nodes should be smaller than a certain amount to increase the ability of the device to predict the values of a child node based on the value of the parent node. As a result, the monotonically decreasing tree structure is input to the difference limit tree processor 12c to limit the magnitudes of the differences between parent nodes and corresponding child nodes such that the difference is less than a maximum value. After the difference between the parent nodes and the child nodes is limited, the tree structure is input by the tree list formulator 12d which generates a corresponding tree list and outputs such tree list to the first arithmetic coder 14.

Figure 2B:
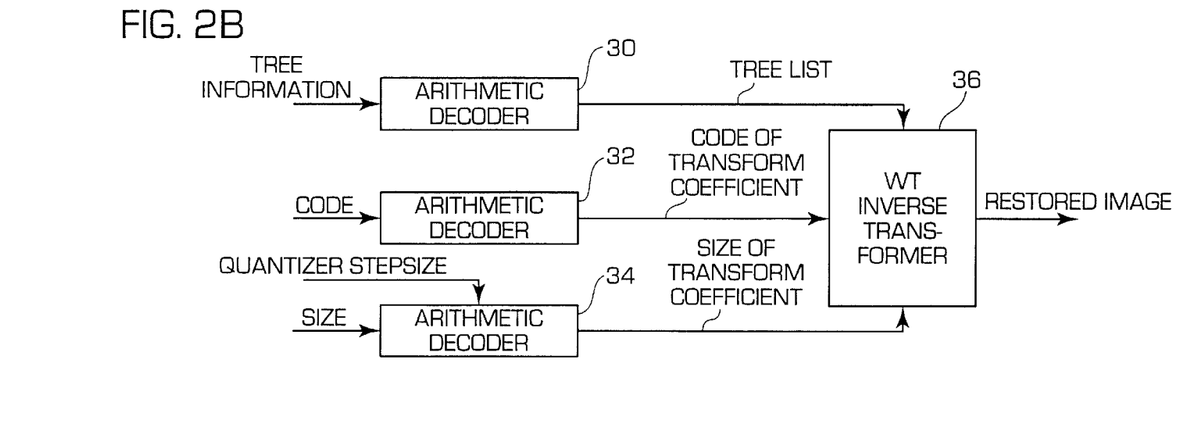
FIG. 2B is a block diagram showing an embodiment of a decoding device using a decompression decoding method according to the present invention.

FIG. 2B illustrates an image decompression decoder which decompresses the image output from compression coder shown in FIG. 2A. The decoder comprises a first arithmetic decoder 30, a second arithmetic decoder 32, a third arithmetic decoder 34, and a wavelet inverse transformer 36.

The first arithmetic decoder 30 inputs the encoded tree list from the first arithmetic coder 14 and outputs a corresponding decoded tree list. In addition, the second and third arithmetic decoders 32 and 34 input and decode the encoded code and size data from the second and third arithmetic coders 20 and 22, respectively. Then, the inverse transformer 36 inputs the tree list, the code data, and the size data corresponding to the transform coefficients and outputs a restored image based on such data.

Figure 3:
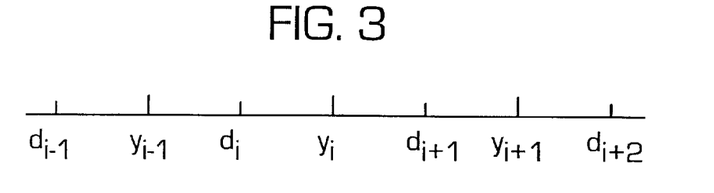
FIG. 3 shows a quantizing interval and a central value.

In order to more fully understand the operations of the various components of the coder and decoder described above, some mathematical equations relating to their operations will be described below. First, as shown in FIG. 3, when a real number x is quantized, a representative value $\bar{x}$ of the quantizing interval and a quantization value $y_i$ represents the value $\bar{x}$ for the $i^{th}$ quantizing interval $[d_i, d_{i+1}]$ can be expressed as follows:

$$x \approx \bar{x} = y_i \quad (1)$$

where $d_i \leq x < d_{i+1}$ and $[d_i, d_{i+1}]$ denotes the quantizing interval. As a result, a quantization error Err(x) generated from such quantization can be determined according to the following equation:

$$\text{Err}(x) = x - \bar{x} = x - y_i \quad (2)$$

Accordingly, the mean square of the errors E can be computed as follows:

$$E = E[(x - \bar{x})^2] \quad (3)$$
$$= \int_0^\infty (x - \bar{x})^2 p(x) dx$$
$$= \sum_{i=0}^\infty \int_{d_i}^{d_{i+1}} (x - y_i)^2 p(x) dx$$

where p(x) equals a probability density function. Furthermore, the quantization value $y_i$ which minimizes the value of the mean square of the errors E can be obtained by differentiating equation (2) and setting its value equal to zero as follows:

$$\frac{\partial E}{\partial y_i} = 2 \int_{d_i}^{d_{i+1}} (x - y_i) p(x) dx = 0 \quad (4)$$

$$y_i = \frac{\int_{d_i}^{d_{i+1}} x p(x) dx}{\int_{d_i}^{d_{i+1}} p(x) dx}$$

As shown in equation (4), the quantization value $y_i$ is an average of the value x in the quantizing interval $[d_i, d_{i+1}]$ when the mean square of the errors E is minimized.

In the quantization method proposed in the present invention, uniform quantization may performed based on a quantizer step size G, and the quantizing interval $[d_i, d_{i+1}]$ may expressed as $[kG-r, (k+1)G-r]$. In this instance, the input x is expressed as an integer multiple k of the quantizer step size G, and the transform coefficient x can be expressed as:

$$x \approx \bar{x} = kG \quad (5)$$

where $kG-r \leq x < (k+1)G-r$ for $k \in Z$, kG represents the quantization value, and r represents a constant determined by the quantizer step size G and by the statistical characteristics of the input image. Thus, in order to minimize the mean square of the errors E of the value kG, the value kG must be set to a value which satisfies the equation (4). In other words, the most ideal quantizing interval $[kG-r, (k+1)G-r]$ for selecting the value kG can be determined by the combining equations (3) to (5) to produce the following equation:

$$kG = \frac{\int_{kG-r}^{(k+1)G-r} x p(x) dx}{\int_{kG-r}^{(k+1)G-r} p(x) dx} \quad (6)$$

In order to determine a constant r which satisfies equations (3) through (6), two methods may be used. In the first method, a histogram of the wavelet transform coefficients of the input image is obtained, and a probability density function p(x) which most closely represents the histogram is determined by a Kolmogorov-Smirniv (KS) test or a $x^2$ test. In the other method, the function p(x) is represented by a piece wise linear function which approximates a histogram of the transform coefficients.

Of the above methods, the latter method is more advantageous than the former method. Specifically, in the former method, a substantial number of various probability density functions p(x) are measured in order to determine the appropriate function p(x) in accordance with the KS test or the $x^2$ test. Thus, many extensive and time consuming calculations must be performed. Furthermore, if the probability density function p(x) is incorrectly predicted, the accuracy of the quantization operation is significantly degraded, and therefore, the KS test or the $x^2$ test cannot be practically used in a situation in which predicting statistical characteristics (such as image signals) is difficult. Accordingly, in the present invention, the constant r is determined by determining a piece wise linear function which approximates the histogram.

Figure 4:
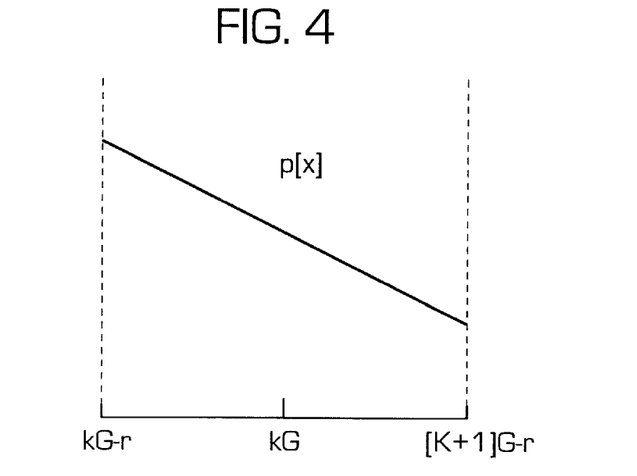
FIG. 4 shows a probability density function approximated as a linear function.

FIG. 4 illustrates the method of linearly approximating the function p(x) in order to determine the value of the constant r which most appropriately corresponds to the input image signal. In this example, the function p(x) may be approximated as the linear function p(x)=ax+b, in which a and b are arbitrary constants. Accordingly, the approximated function p(x) may be incorporated into equation (6) to produce the following equations:

$$kG = \frac{\int_{kG-r}^{(k+1)G-r} x(ax+b) dx}{\int_{kG-r}^{(k+1)G-r} (ax+b) dx} \quad (7)$$

$$kG \int_{kG-r}^{(k+1)G-r} (ax+b) dx = \int_{kG-r}^{(k+1)G-r} x(ax+b) dx \quad (8)$$

Then, the following quadratic equation can be obtained from equation (8):

$$ar^2 - [aG + p(kG)]r + aG^2/3 + Gp(kG)/2 = 0$$

A quantization interval $[kG-r, (k+1) G-r]$ for a representative value kG is set using the positive value of the two values of r satisfying equation (9).

Figure 5:
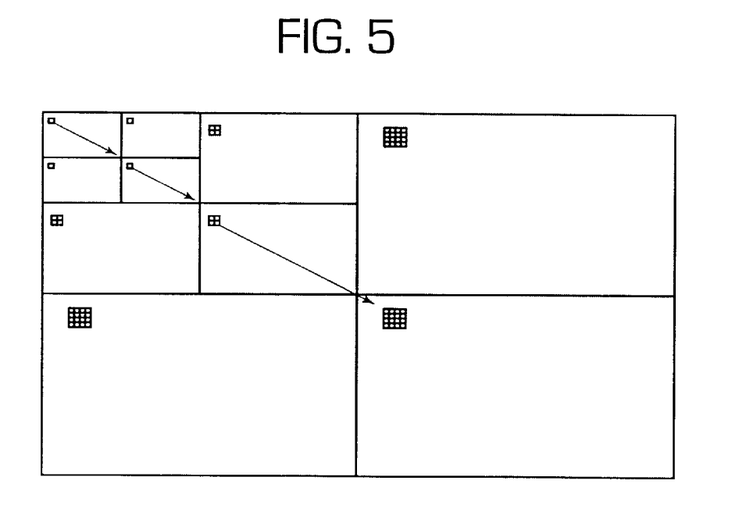
FIG. 5 is a view of a tree structure of transform coefficients.

As mentioned above, the present invention employs a tree coding method for effectively expressing the transform coefficients of the input image. Such method obtains transform coefficients by wavelet-transforming an input image and expresses the coefficients as a tree structure. As a result, the capability of efficiently using various systematic characteristics of the wavelet transform coefficients is increased. An example of how the wavelet-transformed image information may be expressed as a tree structure is shown in FIG. 5.

Specifically, if the transform coefficients are expressed according to a corresponding quantizer step size G, the number of digits required to express each transform coefficient is considered to be the "height" of the transform coefficient, and the heights of various transform coefficients are expressed as a tree structure. Accordingly, when a tree list is recorded or transmitted, the values of the parent nodes and current nodes of the tree structure correspond to the transform coefficients, and the tree list contains information relating to the height between the parent nodes and corresponding current nodes.

Also, the information represented by the heights denote the number of information classes required to restore the corresponding transform coefficients. As a result, a decoder is capable of restoring the transform coefficients by reading the necessary height information.

1) Simple Tree Structure

As illustrated above, the simple expression tree processor 12a inputs transform coefficients from the wavelet transformer 10. Based on the coefficients, the processor 12a generates a simple tree structure having parent nodes and child nodes and containing information relating to the heights between the parent nodes and corresponding child nodes. The height value $h(C_{ij})$ of each transform coefficient $C_{ij}$ may be determined according to the following equation when $|C_{ij}| \geq G-r$:

$$h(C_{ij}) = \log_2 \frac{|C_{ij}| + r}{G} \quad (10)$$

Furthermore, the height value $h(C_{ij})$ equals zero when $|C_{ij}|<G-r$ and $\exists m \in Dc_{ij}$ for $|m| \geq G$, and the height value $h(C_{ij})$ equals NULL when $|C_{ij}|<G-r$ and $\forall m \in Dc_{ij}$ for $|m|<G$. In other words, the height value $h(C_{ij})$ is only determined by equation (10) when the absolute value of the transform coefficient $C_{ij}$ is greater than or equal to the difference between the quantizer step size G and the constant r. In other words, the height value $h(C_{ij})$ is determined by equation (10) when $|C_{ij}| \geq G-r$. On the other hand, when the difference between the quantizer step size G and the constant r is greater than the absolute value of the transform coefficient $C_{ij}$ (i.e. $|C_{ij}|<G-r$), the height value $h(C_{ij})$ is not determined in accordance with equation (10).

Specifically, each of transform coefficients $C_{ij}$ may have one or more child nodes $Dc_{ij}$. If $|C_{ij}|<G-r$ and if the absolute value m of at least one of the child nodes $Dc_{ij}$ is greater than or equal to the quantizer step size G (i.e. if there exists a value $m \in Dc_{ij}$ for $|m| \geq G$), then the height value $h(C_{ij})$ is set equal to zero. On the other hand, if $|C_{ij}|<G-r$ and if the absolute value of the value m of every one of the child nodes $Dc_{ij}$ is less than the quantizer step size G (i.e. if for every value $m \in Dc_{ij}$, $|m|<G$), the height value $h(C_{ij})$ is set equal to NULL.

The term "$Dc_{ij}$" recited above represents the set of all child nodes which correspond to the transform coefficient $C_{ij}$. In addition, the simple tree structure comprises tree information $T(i,j)$ which corresponds to the transform coefficient $C_{ij}$. Moreover, the tree information $T(i,j)$ may express each transform coefficients $C_{ij}$ as the height $h(C_{ij})$ of the coefficient $C_{ij}$ such that $T(i,j)=h(C_{ij})$.

In addition, if all values of the transform coefficients $C_{ij}$ and the corresponding child nodes $Dc_{ij}$ are smaller than the quantizer step size G, the height $h(C_{ij})$ is set to a NULL value, and the values of the child nodes $Dc_{ij}$ are not transmitted or recorded by the device. Also, if the value of current transform coefficient $C_{ij}$ is smaller than the quantizer step size G (such that the value of quantized coefficient becomes zero) and some of the values of the corresponding child nodes $Dc_{ij}$ are larger than the quantizer step size G, then the height $h(C_{ij})$ is set to zero.

When the tree list is only represented by the simple tree structure such that the information $T(i,j)=h(C_{ij})$, the height $h(C_{ij})$ of a parent node $C_{ij}$ may be less than the height $h(Dc_{ij})$ of a corresponding child node $Dc_{ij}$. As a result, the height differences between a parent and child nodes may equal a negative number. However, in order to more easily predict the tree information $T(i,j)$ corresponding to the child nodes $Dc_{ij}$, the tree information $T(i,j)$ of the simple tree structure should preferably monotonically decrease as one travels from the parent node $C_{ij}$ to the corresponding child nodes $Dc_{ij}$. In other words, the height difference (and the information $T(i,j)$) between parent and child nodes should equal a positive number.

2) Monotonically Decreasing Tree Structure

Since the tree information $T(i,j)$ between a parent node and a child node of the simple tree structure may not monotonically decrease, the tree structure generated by the simple expression tree method may not adequately represent the final tree list. Accordingly, the simple tree structure containing the transform coefficients $C_{ij}$ is transformed into a monotonically decreasing tree structure in accordance with the following equation:

$$\text{If } \max_{m \in Dc_{ij}} h(m) > h(C_{ij}), \text{ then } T(i, j) = \max_{m \in Dc_{ij}} h(m) \quad (11)$$

As illustrated by equation (11), the tree information $T(i,j)$ of the simple tree structure is modified such that all transform coefficients $C_{ij}$ correspond to information $T(i,j)$ which monotonically decreases from the parent node to the child node. Furthermore, each value $T(i,j)$ of the monotonically decreasing tree structure which equals zero is removed from the remaining $T(i,j)$ values.

However, even if the simple tree structure is transformed into a monotonically decreasing tree structure, predicting the tree information $T(i,j)$ for at least some of the child nodes may still be difficult or impossible. Accordingly, in order to more effectively code a tree list, a monotonically decreasing tree structure should still be transformed such that the information $T(i,j)$ of the child nodes is more easily predictable.

3) Limiting the Difference Values

One method of transforming the monotonically decreasing tree structure such that the value $T(i,j)$ of the child nodes is more predictable is to limit the difference $\text{Diff}(C_{ij})$ between the value $T(i_p,j_p)$ of the parent node and the value $T(i,j)$ of the child node. In particular, in a monotonically decreasing tree structure, the difference $\text{Diff}(C_{ij})$ between the value $T(i_p,j_p)$ of the parent node and the value $T(i,j)$ of the child node may be expressed by the following equation:

$$\text{Diff}(C_{ij})=T(i_p,j_p)-T(i,j) \quad (12)$$

However, predicting the various difference values $\text{Diff}(C_{ij})$ is difficult because statistical characteristics relating to input images vary with each input image. However, predicting the value of the difference $\text{Diff}(C_{ij})$ may made easier if the difference $\text{Diff}(C_{ij})$ is restricted to be less than or equal to a predetermined maximum difference Maxdiff. In other words, equation (12) could be modified as follows:

$$T(i,j)=T(i_p,j_p)-\text{Maxdiff if } T(i_p,j_p)-T(i,j)>\text{Maxdiff} \quad (13)$$

$$T(i,j)=T(i_p,j_p)-\text{Diff}(C_{ij}) \text{ if } T(i_p,j_p)-T(i,j) \leq \text{Maxdiff}$$

Accordingly, if the difference $\text{Diff}(C_{ij})$ is restricted to be less than or equal to the maximum difference Maxdiff, predicting the difference $\text{Diff}(C_{ij})$ is easier because it falls within a narrower range of values. Therefore, if the difference Diff($C_{ij}$) is limited to Maxdiff, the information T(i,j) of the child nodes is easier to estimate because it falls within a range of values which are closer to the value T($i_p,j_p$) of the parent node.

4) Tree List Formulation

As indicated above, each node within the generated tree list generally has a certain number of corresponding child nodes. However, if the values T(i,j) value of a particular node is NULL, all coefficient values $Dc_{ij}$ of the corresponding child nodes are less than or equal to the quantizer step size G. As a result, the tree information T(i,j) of the particular node is set to NULL and recorded on the tree list, and none of the values T(i,j) of the corresponding child nodes are recorded.

For example, as illustrated in FIG. 5, a node contained within the lowest band of the image (i.e. a node representing the lowest frequency component) has only three child nodes. Furthermore, all nodes except for the nodes of the highest band have four child nodes. Also, the nodes of the highest band (i.e. the nodes representing the highest frequency component) cannot have child nodes and cannot have values T(i,j) which equal zero. Furthermore, the node of the lowest band cannot have a parent node and is considered the root of each tree structure.

Based on the configuration above, the values T(i,j) of the parent and child nodes are stored within the tree list during its creation. In particular, the values T(i,j) of the child nodes are added to the tree list after the value T(i,j) of the corresponding parent node is recorded in the tree list.

5) Tree List Coding

After the tree list has been formed in the manner above, the tree list is compressed according to an appropriate coding method. Two of the methods by which the tree list may be compressed are the Huffman coding method and the arithmetic coding method.

The Huffman coding method utilizes codes which have a minimum average code length and is useful for instantaneous decoding. However, in order to use such method, a predetermined probability value for each symbol used in the entire tree list and an appropriate probability model must be known in advance. Accordingly, a probability model appropriate for coding the tree structure for various input images should preferably be determined since the probability values for each symbol of the entire input image cannot be obtained beforehand.

However, if the probability of the actual input image codes is different from the probabilities contained in the predetermined probability model, the compression efficiency of the Huffman coding method is significantly reduced. Moreover, the compression efficiency is also substantially lowered when a symbol has a large probability value (e.g. if the symbol has a probability close to 1).

In light of the restrictions inherent in the Huffman coding method, the present invention preferably employs the arithmetic coding method which utilizes an adaptive model. In the arithmetic coding method, data compression is performed by approximating the entropy of the tree list. Moreover, since an adaptive model is used, providing a predetermined probability model for the tree structure and a predetermined probability value for each code within the tree structure are unnecessary.

In order to more easily understand the arithmetic coding method, some of the mathematical equations and theories utilized by the method will be described below. First, if an input image comprises a set S of M symbols (i.e. S={$x_1,x_2, \ldots x_M$}) and if each symbol $x_j$ has a probability density function $p(x_j)$ when the M symbols are coded, the information volume I($x_j$) of the symbol $x_j$ and the entropy H(S) of all of the coded M symbols are respectively represented by the following equations:

$$I(x_j) = \log\left[\frac{1}{p(x_j)}\right] \quad (14)$$

$$H(s) = \sum_{j=1}^{M} p(x_j)\log\left[\frac{1}{p(x_j)}\right] \quad (15)$$

$$= \sum_{j=1}^{M} p(x_j)I(x_j)$$

where $$\sum_{j=1}^{M} p(x_j) = 1.$$

Furthermore, if the set S of M symbols is separated into N subsets $S_1$ to $S_N$ which can be coded and decoded, the set S can be expressed as the group of subsets $S_1$ to $S_N$ as follows:

$$S=S_1 \cup S_2 \ldots \cup S_N = \{x_{1,1}, \ldots, x_{1,p}\} \cup \{x_{2,p+1}, \ldots, x_{2,q}\} \ldots \cup \{x_{N,r+1}, \ldots, x_{N,M}\} \quad (16)$$

If each subset $S_i$ (i=1 to N) is independently coded, the information volume I($x_{ij}$) and entropy $E_i(S_i)$ of each subset $S_i$ can be expressed as follows:

$$I(x_{ij}) = \log\left[\frac{1}{p(x_{ij})}\right] \quad (17)$$

$$E_i(S_i) = \sum_{\forall x_i \in S_i} p(x_{ij})\log\left[\frac{1}{p(x_{ij})}\right] \quad (18)$$

$$= \sum_{\forall x_i \in S_i} p(x_{ij})I(x_{ij})$$

where $$\sum_{\forall x_i \in S_i} p(x_{ij}) = 1.$$

Furthermore, the probabilities p($x_j$) and p($x_{ij}$) ($x_{ij} \in S_i, x_j$) can be used to compare the compression efficiency of the data of the set S by using arithmetic codes. Furthermore, if the set S is divided into N subsets $S_i$, the probabilities p($x_j$) and p($x_{ij}$) can be expressed as follows:

$$p(x_{ij}) = \frac{p(x_i)}{\sum_{\forall x_i \in S_i} p(x_j)} \quad (19)$$

$$= \frac{p(x_j)}{p(S_i)}$$

Accordingly, when the set S is divided into N subsets $S_i$ and an arbitrary symbol $x_j$ of an input image is coded, the entropy E(S) can be determined based on the following equations:

$$E(S) = \sum_{i=1}^{N} p(S_i)E_i(S_i) \quad (20)$$

-continued $$= \sum_{i=1}^{N} \sum_{\forall x_j \in S_i} p(S_i) p(S_{ij}) I(x_{ij})$$

$$= \sum_{i=1}^{N} \sum_{\forall x_j \in S_i} x_j I(x_{ij})$$

$$= \sum_{i=1}^{N} p(x_i) I(x_{ij})$$

Furthermore, the relationship between the probabilities $p(x_{ij})$ and $p(x_j)$ relating to amount of information contained in identical symbols $x_j$ and $x_{ij}$ ($x_{ij} \in S_i x_j$) can be expressed by the following equations:

$$p(x_{ij}) \le p(x_j) \because \sum_{\forall x_{ij} \in S_i} p(x_{ij}) \le 1 \quad (21a)$$

$$\frac{1}{p(x_{ij})} \le \frac{1}{p(x_j)} \quad (21b)$$

Moreover, since logarithms are monotonically increasing functions, the following equations can be derived from equation (21b):

$$\log\left[\frac{1}{p(x_{ij})}\right] \le \log\left[\frac{1}{p(x_j)}\right] \quad (21c)$$

$$I(x_{ij}) \le I(x_j) \quad (21d)$$

As a result, the relationship between the entropy function E(S) (equation (20)) and the entropy function H(S) (equation (15)) can be expressed as follows:

$$E(S) \le H(S) \quad (22)$$

$$p(x_{ij}) I(x_{ij}) \le p(x_j) I(x_j)$$

As demonstrated above, when a set S containing a group of M symbols is given, an arbitrary symbol $x_j$ can be more effectively coded if the subset $S_i$ containing the symbol $x_j$ can be determined. In other words, the symbol $x_j$ can be more effectively coded if the previous state indicates which arithmetic coder can code the symbol $x_j$.

Furthermore, as previously stated, the image transform coefficients are expressed as a monotonically decreasing tree structure, and the maximum height difference between a parent node and child node of the tree structure is limited by a predetermined maximum difference Maxdiff. Accordingly, since the difference in height between the parent node and the current node is used to calculate the height of the current node, the type of symbol used to code the current node can be predicted based on the parent node when the tree list is being generated. Examples of various codes of arithmetic symbols which depend upon the state of the parent node are expressed in Table 1.

TABLE 1

| PARENT NODE T(.,.) | SYMBOL SET |
|---|---|
| 1 | {NULL, 0} |
| 2 | {NULL, 0, 1} |
| 3 | {NULL, 0, 1, 2} |

TABLE 1-continued

| PARENT NODE T(.,.) | SYMBOL SET |
|---|---|
| 4 | {NULL, 0, 1, 2, 3} |
| 5 | {NULL, 0, 1, 2, 3, 4} |
| . | . |
| . | . |
| . | . |
| T(.,.) > MAXDIFF | {NULL, 0, 1, ..., MAXDIFF} |

As illustrated in Table 1, the tree list can be coded by separate arithmetic coders which respectively encode symbols that correspond to the various states of the parent node T(i,j). Consequently, the number of arithmetic coders required for compressing the tree structure is equal to the predetermined maximum difference Maxdiff+1.

6) Transform coefficient expression

The number of bits used to express each transform coefficient $C_{ij}$ in accordance with the quantizer step size G can be determined from the completed tree list. However, although both sign and magnitude bits are generally required to express a number, the number can be expressed by the following equation if the number of bits is already known:

$$C_{ij} \approx \overline{C_{ij}} = \sum_{p=T(i,j)}^{h(C_{ij})} S_p G 2^p + \sum_{q=h(C_{ij})-1}^{0} Sh(C_{ij}) b_q G 2^q \quad (23)$$

$$S_p = \begin{cases} -1 & x < 0, \; p = h(C_{ij}) \\ \text{dummy} & p > h(C_{ij}) \\ 1 & x \le 0, \; p = h(C_{ij}) \end{cases}$$

$$b_q = \begin{cases} 0 & |x+r| - \sum_{k=q+1}^{h(x)} b_k G 2^k < G 2^q \\ 1 & |x+r| - \sum_{k=q+1}^{h(x)} b_k G 2^k \ge G 2^q \end{cases}$$

When expressing an arbitrary number "x" to be used in equation (23) where S equals the height value of the transform coefficients of the parent node of the child node having the tree information T(i,j) and the height value $h(C_{ij})$, the sign of "x" may be located in the most significant bit of the data representing the number "x", and thus, the sign can be determined by h(x). On the other hand, a decoder which decodes the value of $b_{h(x)}$ is not required to know the value of the most significant bit because the value of the most significant bit of $b_{h(x)}$ is always equal to "1". As a result, the most significant bit position can be saved when the magnitudes of all transform coefficients are stored in the tree list.

In addition, the data that a coding device generally provides to a decoding device is not the height value $h(C_{im})$ relating to the transform coefficient $C_{ij}$ but is the tree information T(i,j) relating to such coefficient $C_{ij}$. Consequently, the T(i,j) value is typically less than or equal to the value of the height $h(C_{ij})$. Therefore, if the tree information T(i,j) is greater than the value of the height $h(C_{ij})$, a dummy sign is placed before the real value of the coefficient which is expressed as the quantizer step size G. (See equation (23)). Accordingly, in order to express one transform coefficient, the code and size data are required, and such data are independently compressed via the arithmetic coding method.

In accordance with one embodiment of the present invention, an Antonni 9-7 biorthogonal wavelet filter may be used as the wavelet filter. Furthermore, the analysis level may be set to "6", and the predetermined maximum difference value Maxdiff may equal "4". In addition, in order to realize a border condition of a filter, a method of symmetric extension may be used.

Also, in the image compression coding method of the present invention, various compression ratios can be obtained depending on the value of quantizer step size G. For example, such ratios may be obtained by using a method which is similar to JPEG methods for obtaining various kinds of compression ratios by changing the "quality factor".

In order to compare the performance of the image coding method of the present invention with other coding methods, a 512×512 "Lena" image (FIG. 6) and "Baboon" image (FIG. 7) with 256 gradations having different statistical characteristics were compressed by a coder and decompressed by a decoder in accordance with each method. Then, the restored image was compared with the original image before compression (including the header of the image) to determine the accuracy of each coder and decoder.

Also, the various compression coding methods were standardized with respect to each other by using the same or similar arithmetic signs, models for the arithmetic signs, a fixed model, and uniform probability. Furthermore, compression was performed on data comprising a 14-byte header in which four bytes represented the size of the image, one byte represented the level of the image, one byte represented the height of the transform coefficient, and eight bytes corresponded to the quantizer step size G.

In addition, the probability density function for ascertaining the quantizing interval was determined based on the histogram of the transform coefficient (which was approximated as a linear function within the quantizing interval). As a result, an efficient quantizing interval was determined according to the value of the quantizer step size G.

Figure 6:
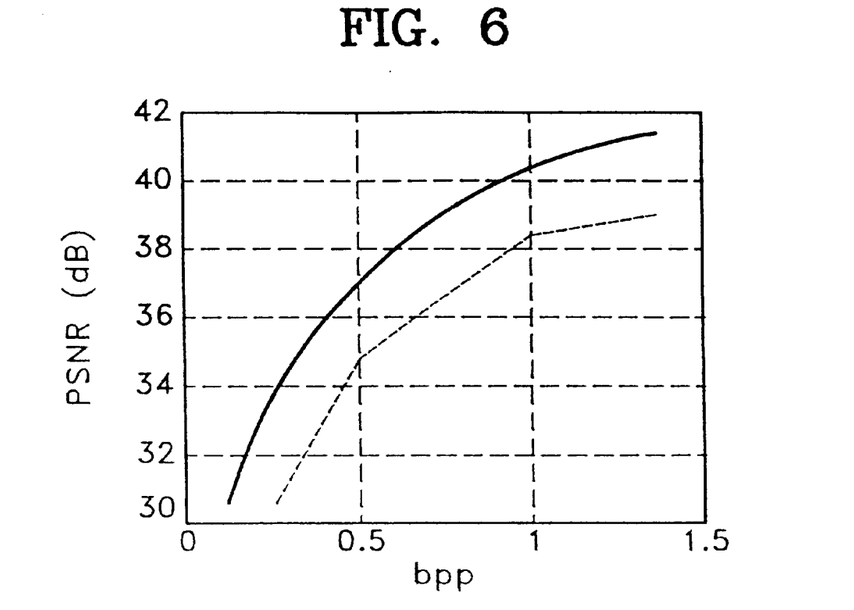
FIG. 6 is a graph comparing performances between a JPEG compression method and a compression coding method according to the present invention.
Figure 7:
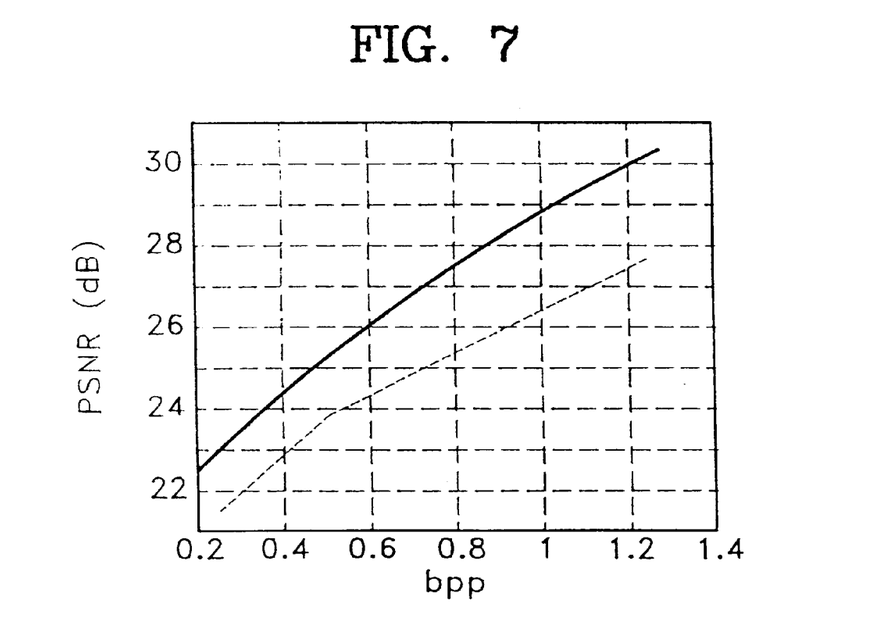
FIG. 7 is another graph comparing performances between the JPEG compression and the compression coding method according to the present invention.

FIGS. 6 and 7 respectively show the results of the "Lena" and "Baboon" images after they have been decompressed by a decoder. Specifically, each of the figures illustrate the change in picture quality (PSNR) of each image as a function of the compression ratio (bpp). Also, in each of the graphs, the results of the present invention are represented by solid lines, and the results of the JPEG compression are represented by dotted lines. Furthermore, in the comparative analysis, the JPEG compression method employed a common image compression coding method such as DCT coding.

Table 2 also illustrates a comparison among the coding method of the present invention, the Shapiro coding method, and the Said coding method. Since the Shapiro and Said coding methods employ a successive approximation technique, each aspect of the coding methods could not be directly compared with the coding method of the present invention. However, all of the methods were compared while operating under the same conditions to the furthest extent possible. In any event, the comparative analysis was performed by compressing the Lena image by predetermined compression ratios bpp in accordance with each method. Subsequently, the image was decompressed based on each method, and the resultant change in picture quality PSNR was observed. (In Table 2, the letter "G" denotes the value of quantizer step size).

TABLE 2

| | ALGORITHM | | |
|---|---|---|---|
| RATE | SHAPIRO | SAID | PRESENT INVENTION |
| 0.25bpp (32:1) | 31.33dB | 33.69dB | 33.83dB (G:0.5139) |
| 0.5bpp (16:1) | 36.26dB | 36.84dB | 36.95dB (G:0.2568) |
| 1.0bpp (8:1) | 39.55dB | 40.12dB | 40.21dB (G:0.1261) |

In the image compression coding method of the present invention, the height of wavelet transform coefficient is expressed as a tree structure, the tree structure is efficiently coded by arithmetic-coding, and an ideal quantizing interval is determined based on a predetermined quantizer step size. Consequently, image data can be compressed much more efficiently, and the quality of the resultant restored image is substantially improved. Furthermore, the method is capable of compressing data at a high-compression rate to achieve low-PSNR and at a low-compression rate to achieve high-PSNR.

Furthermore, the present invention may also be used in various other applications besides image compression. For example, the invention may be used for sound compression and can be utilized in image recording equipment such as high-definition televisions, filmless cameras, digital video-cassette recorders and camcorders, CD audio equipment, and broadcasting equipment.

Furthermore, it is to be understood that the above described embodiments of the invention are only illustrative and that modifications thereof may occur to those skilled in the art. Accordingly, the present invention is not to be regarded as limited to the embodiments disclosed herein, but is to be limited only as defined by the appended claims.

What is claimed is:

1. An image compression method which uses a wavelet transform technique and which converts an input image into coded data of an output compressed image, comprising the steps of:

(a) inputting said input image and obtaining transform coefficients by transforming said input image in accordance with said wavelet transforming technique;

(b) determining a quantizing interval which minimizes quantization errors in a predetermined step size, wherein said quantizing interval is determined according to statistical characteristics of said input image;

(c) generating a simple tree structure based on said transform coefficients;

(d) modifying said simple tree structure by using statistical characteristics of said transform coefficients to produce a monotonically decreasing tree structure, wherein said monotonically decreasing tree structure comprises a parent node and child nodes which correspond to said parent node;

(e) modifying said monotonically decreasing tree structure by limiting a maximum height difference between said parent node and said child nodes to produce a modified tree list;

(f) quantizing said transform coefficients based on said quantizing interval to produce quantized transform coefficients; and (g) arithmetically coding said modified tree list and said quantized transform coefficients to produce said coded data, wherein said coded data corresponds to said output compressed image.

2. An image compression method according to claim 1, wherein said step (b) of determining said quantizing interval comprises the steps of:

(b1) obtaining a density function p(x) based on a histogram of said transform coefficients, wherein said density function p(x) is a function of x and wherein x corresponds to data relating to said input image;

(b2) manipulating said density function p(x) such that said density function approximates a piece wise linear function; and (b3) determining said quantizing interval having minimal quantization errors based on said piece wise liner function.

3. An image compression method according to claim 2, wherein said quantizing interval satisfies the equation:

$$kG = \frac{\int_{kG-r}^{(k+1)G-r} x(ax+b)dx}{\int_{kG-r}^{(k+1)G-r} (ax+b)dx}$$

wherein said density function p(x) equals ax+b, a and b are arbitrary constants, k is an integer, G is said predetermined step size, r is a constant determined by said statistical characteristics of said input image and said predetermined step size G, and kG is a quantization value, and wherein said quantizing interval is defined by [kG−r, (k+1)G−r)].

4. An image compression method according to claim 1, wherein said step (c) of generating said simple tree structure comprises the step of:

(c1) determining a height $h(C_{ij})$ of said transform coefficients $C_{ij}$, wherein said height $h(C_{ij})$ satisfies the equation:

$$h(C_{ij}) = \log_2 \frac{|C_{ij}| + r}{G}$$

if $|C_{ij}| \geq G - r$, wherein said height $h(C_{ij})$ equals zero if $|C_{ij}|<G-r$ and $\exists m \in Dc_{ij}$ for $|m| \leq G$, wherein said height $h(C_{ij})$ equals NULL if $|C_{ij}|<G-r$ and $\forall m \in Dc_{ij}$ for $|m|<G$, wherein said height $h(C_{ij})$ is deemed not to exist if said height $h(C_{ij})$ equals NULL, and wherein $Dc_{ij}$ represents sets of values of said child nodes respectively corresponding to said transform coefficients $C_{ij}$, G equals said predetermined step size, r is a constant determined by said statistical characteristics of said input image and said predetermined step size G, i equals a first set of integers, j equals a second set of integers, and m is an element of said sets of values of said child nodes.

5. An image compression method according to claim 4, wherein said step (d) of modifying said simple tree structure to produce said monotonically decreasing tree structure comprises the step of:

(d1) modifying tree information T(i,j) which corresponds to said transform coefficient $C_{ij}$ and which is contained in said simple tree structure, wherein said tree information T(i,j) is modified in accordance with the following equation:

If $\underset{m \in Dc_{ij}}{\text{MAX}} h(m) > h(C_{ij})$, then $T(i, j) = \underset{m \in Dc_{ij}}{\text{MAX}} h(m)$ 6. An image compression method according to claim 5, wherein said step (e) of modifying said monotonically decreasing tree structure to produce said modified tree list comprises the steps of:

(e1) limiting a height difference $\text{Diff}(C_{ij})$ between said parent node and said child nodes in accordance with the equations:

$T(i,j)=T(i_p,j_p)-\text{Maxdiff}$ if $T(i_p,j_p)-T(i,j)>\text{Maxdiff}$, and $T(i,j)=T(i_p,j_p)-\text{Diff}(C_{ij})$ if $T(i_p,j_p)-T(i,j) \leq \text{Maxdiff}$, wherein $T(i_p,j_p)$ equals tree information which corresponds to one of said transform coefficients $C_{ij}$ that relates to said parent node, T(i,j) equals tree information which corresponds to said transform coefficients $C_{ij}$ that relate to said child nodes, and Maxdiff is said maximum height difference between said parent node and said child nodes.

7. An image compression method according to claim 1, wherein said step (g) of arithmetically coding said modified tree list comprises the steps of:

(g1) separating a set S of symbols in said modified tree list into N subsets $S_1$ to $S_N$, wherein said symbols relate to said input image and wherein said subsets $S_1$ to $S_N$ are capable of being independently coded and decoded;

(g2) determining a particular subset $S_i$ of said subsets $S_1$ to $S_N$ to which particular symbols of said symbols belong based on previously coded information contained within said modified tree list;

(g3) coding said particular symbols which correspond to said particular subset $S_i$ by an arithmetic coder which corresponds to said particular subset $S_i$; and (g4) arithmetically coding at least one of said quantized transform coefficients by dividing said at least one of said quantized transform coefficients into code data and size data and arithmetically coding said code data and said size data.

8. A method of generating quantized data based on transform coefficients corresponding to an input image, wherein said method comprises the steps of:

(a) inputting said input image;

(b) obtaining said transform coefficients by transforming said input image in accordance with a wavelet transform technique;

(c) obtaining a density function p(x) based on a histogram of said transform coefficients;

(d) manipulating said density function p(x) such that said density function approximates a piece wise linear function;

(e) determining a quantizing interval having minimal quantization errors for a predetermined step size based on said piece wise liner function; and (f) quantizing said transform coefficients based on said quantizing interval to produce said quantized data corresponding to said input image.

9. A method of quantization according to claim 8, wherein said quantizing interval satisfies the equation:

$$kG = \frac{\int_{kG-r}^{(k+1)G-r} x(ax+b)dx}{\int_{kG-r}^{(k+1)G-r} (ax+b)dx}$$

wherein said density function p(x) equals ax+b, a and b are arbitrary constants, k is a real number, G is said predetermined step size, r is a positive number, and kG is a quantization value, and wherein said quantizing interval is defined by [kG−r, (k+1)G−r)].

10. A method of generating a tree list based on transform coefficients corresponding to an input image, comprising the steps of:

(a) inputting said input image;

(b) obtaining said transform coefficients by transforming said input image in accordance with a wavelet transform technique;

(c) generating a simple tree structure which corresponds to said transform coefficients by determining a height $h(C_{ij})$ for each of at least some of said transform coefficients $C_{ij}$, wherein said height $h(C_{ij})$ satisfies the equation:

$$h(C_{ij}) = \log_2 \frac{|C_{ij}| + r}{G}$$

if $|C_{ij}| \geq G - r$, wherein said height $h(C_{ij})$ equals zero if $|C_{ij}|<G-r$ and $\exists m \in Dc_{ij}$ for $|m| \geq G$, wherein said height $h(C_{ij})$ equals NULL if $|C_{ij}|<G-r$ and $\forall m \in Dc_{ij}$ for $|m|<G$ wherein said height $h(C_{ij})$ is deemed not to exist if said height $h(C_{ij})$ equals NULL, and wherein $Dc_{ij}$ represents sets of values of child nodes within said simple tree structure, said child nodes respectively correspond to said transform coefficients $C_{ij}$, G equals a predetermined step size, r is a positive number, i equals a first set of integers, j equals a second set of integers, and m is an element of said sets of values of said child nodes; and (d) generating simple tree structure data corresponding to said simple tree structure.

11. A method of generating a tree list according to claim 10, further comprising the step of:

(e) modifying said simple tree structure to produce a monotonically decreasing tree structure by modifying tree information T(i,j) which corresponds to said transform coefficients $C_{ij}$ and which is contained in said simple tree structure, wherein said tree information T(i,j) is modified in accordance with the following equation:

If $\underset{m \in Dc_{ij}}{\mathrm{MAX}} h(m) > h(C_{ij})$, then $T(i, j) = \underset{m \in Dc_{ij}}{\mathrm{MAX}} h(m)$ 12. A method of generating a tree list according to claim 11, further comprising the step of:

(f) modifying said monotonically decreasing tree structure to produce said tree list by:

(f1) limiting a height difference $\mathrm{Diff}(C_{ij})$ between a parent node and said child nodes in accordance with the equations:

$T(i,j)=T(i_p,j_p)-\mathrm{Maxdiff}$ if $T(i_p,j_p)-T(i,j)>\mathrm{Maxdiff}$, and $T(i,j)=T(i_p,j_p)-\mathrm{Diff}(C_{ij})$ if $T(i_p,j_p)-T(i,j) \leq \mathrm{Maxdiff}$, wherein $T(i_p,j_p)$ equals tree information which corresponds to one of said transform coefficients $C_{ij}$ that relates to said parent node, T(i,j) equals tree information which corresponds to said transform coefficients $C_{(ij)}$ that relate to said child nodes, and Maxdiff is a predetermined maximum height difference between said parent node and said child nodes, wherein said tree list corresponds to said input image.

13. A method of coding a tree list corresponding to an input image, wherein said method comprises the steps of:

(a) inputting said input image;

(b) transforming said input image into transform coefficients based on a wavelet transform technique;

(c) generating said tree list based on said transform coefficients;

(d) separating a set S of symbols in said tree list into N subsets $S_1$ to $S_N$, wherein said symbols relate to said input image and wherein said subsets $S_1$ to $S_N$ are capable of being independently coded and decoded;

(e) determining a first particular subset $S_i$ of said subsets $S_1$ to $S_N$ to which first particular symbols of said symbols belong based on previously coded information which is contained within said tree list; and (f) coding said first particular symbols which correspond to said first particular subset $S_i$ by a first arithmetic coder which corresponds to said first particular subset $S_i$, wherein said first arthimetic coder codes said first particular symbols into first coded symbol data that corresponds to said input image;

(g) determining a second particular subset $S_j$ of said subsets $S_1$ to $S_N$ to which second particular symbols of said symbols belong based on previously coded information which is contained within said tree list; and (h) coding said second particular symbols which correspond to said second particular subset $S_j$ by a second arithmetic coder which corresponds to said second particular subset $S_j$, wherein said second arthimetic coder codes said second particular symbols into second coded symbol data that corresponds to said input image.

14. A method of coding a tree list according to claim 13, wherein said method further comprises the step of:

(i) arithmetically coding a quantized transform coefficient by dividing said quantized transform coefficient into code data and size data and arithmetically coding said code data and said size data, wherein said quantized transform coefficient corresponds to at least one of said transform coefficients.

15. An image compression method which uses a wavelet transform technique and which converts an input image into an output compressed image, comprising the steps of:

(a) inputting said input image and obtaining transform coefficients by transforming said input image in accordance with said wavelet transforming technique;

(b) determining a quantizing interval which minimizes quantization errors in a predetermined step size, wherein said quantizing interval is determined according to statistical characteristics of said input image;

(c) generating a simple tree structure based on said transform coefficients;

(d) modifying said simple tree structure by using statistical characteristics of said transform coefficients to produce a monotonically decreasing tree structure, wherein said monotonically decreasing tree structure comprises a parent node and child nodes which correspond to said parent node; and (e) modifying said monotonically decreasing tree structure by limiting a maximum height difference between said parent node and said child nodes to produce a modified tree list and generating modified tree list data which corresponds to said output compressed image.

16. An image compression method according to claim 15, wherein said step (b) of determining said quantizing interval comprises the steps of:

(b1) obtaining a density function p(x) based on a histogram of said transform coefficients, wherein said density function p(x) is a function of x and wherein x corresponds to data relating to said input image;

(b2) manipulating said density function p(x) such that said density function approximates a piece wise linear function; and (b3) determining said quantizing interval having minimal quantization errors based on said piece wise liner function.

17. An image compression method according to claim 16, wherein said quantizing interval satisfies the equation:

$$kG = \frac{\int_{kG-r}^{(k+1)G-r} x(ax+b)dx}{\int_{kG-r}^{(k+1)G-r}(ax+b)dx}$$

wherein said density function p(x) equals ax+b, a and b are arbitrary constants, k is an integer, G is said predetermined step size, r is a constant determined by said statistical characteristics of said input image and said predetermined step size G, and kG is a quantization value, and wherein said quantizing interval is defined by [kG−r, (k+1)G−r].

18. An image compression method according to claim 15, wherein said step (c) of generating said simple tree structure comprises the step of:

(c1) determining a height $h(C_{ij})$ of said transform coefficients $C_{ij}$, wherein said height $h(C_{ij})$ satisfies the equation:

$$h(C_{ij}) = \log_2 \frac{|C_{ij}|+r}{G}$$

if $|C_{ij}| \geq G-r$, wherein said height $h(C_{ij})$ equals zero if $|C_{ij}|<G-r$ and $\exists m \in Dc_{ij}$ for $|m| \geq G$, wherein said height $h(C_{ij})$ equals NULL if $|C_{ij}|<G-r$ and $\forall m \in Dc_{ij}$ for $|m|<G$, wherein said height $h(C_{ij})$ is deemed not to exist if said height $h(C_{ij})$ equals NULL, and wherein $Dc_{ij}$ represents sets of values of said child nodes respectively corresponding to said transform coefficients $C_{ij}$, G equals said predetermined step size, r is a constant determined by said statistical characteristics of said input image and said predetermined step size G, i equals a first set of integers, j equals a second set of integers, and m is an element of said sets of values of said child nodes.

19. An image compression method according to claim 18, wherein said step (d) of modifying said simple tree structure to produce said monotonically decreasing tree structure comprises the step of:

(d1) modifying tree information T(i,j) which corresponds to said transform coefficient $C_{ij}$ and which is contained in said simple tree structure, wherein said tree information T(i,j) is modified in accordance with the following equation:

$$\text{If } \max_{m \in Dc_{ij}} h(m) > h(C_{ij}), \text{ then } T(i,j) = \max_{m \in Dc_{ij}} h(m)$$

20. An image compression method according to claim 19, wherein said step (e) of modifying said monotonically decreasing tree structure to produce said modified tree list comprises the steps of:

(e1) limiting a height difference $\text{Diff}(C_{ij})$ between said parent node and said child nodes in accordance with the equations:

$$T(i,j)=T(i_p,j_p)-\text{Maxdiff if } T(i_p,j_p)-T(i,j)>\text{Maxdiff},$$

and $$T(i,j)=T(i_p,j_p)-\text{Diff}(C_{ij}) \text{ if } T(i_p,j_p)-T(i,j) \leq \text{Maxdiff},$$

wherein $T(i_p,j_p)$ equals tree information which corresponds to one of said transform coefficients $C_{ij}$ that relates to said parent node, T(i,j) equals tree information which corresponds to said transform coefficients $C_{ij}$ that relate to said child nodes, and Maxdiff is said maximum height difference between said parent node and said child nodes.

21. A method of generating quantized interval data based on transform coefficients corresponding to an input image, wherein said method comprises the steps of:

(a) inputting said input image;

(b) obtaining said transform coefficients by transforming said input image in accordance with a wavelet transform technique;

(c) obtaining a density function p(x) based on a histogram of said transform coefficients;

(d) manipulating said density function p(x) such that said density function approximates a piece wise linear function; and (e) determining a quantizing interval having minimal quantization errors for a predetermined step size based on said piece wise liner function to produce said quantized interval data corresponding to said input image.

22. A method of quantization according to claim 21, wherein said quantizing interval satisfies the equation:

$$kG = \frac{\int_{kG-r}^{(k+1)G-r} x(ax+b)dx}{\int_{kG-r}^{(k+1)G-r}(ax+b)dx}$$

wherein said density function p(x) equals ax+b, a and b are arbitrary constants, k is a real number, G is said predetermined step size, r is a positive number, and kG is a quantization value, and wherein said quantizing interval is defined by [kG−r, (k+1)G−r].

* * * * *